US010645196B1

(12) United States Patent
Sharipov et al.

(10) Patent No.: US 10,645,196 B1
(45) Date of Patent: May 5, 2020

(54) MULTICOMPONENT SOFTWARE-CONTROLLABLE SYSTEM AND A METHOD FOR INTERACTION OF SERVER-CLIENT PROCESSES AND A MACHINE-READABLE CARRIER FOR PERFORMING THE METHOD

(71) Applicant: Clario Tech Limited, London (GB)

(72) Inventors: Andrii Sharipov, Kyiv (UA); Iurii Skoliar, Kyiv (UA); Volodymyr Shelest, Kyiv (UA)

(73) Assignee: Clario Tech Limited, London (GB)

( * ) Notice: Subject to any disclaimer, the term of this patent is extended or adjusted under 35 U.S.C. 154(b) by 0 days.

(21) Appl. No.: 16/556,732

(22) Filed: Aug. 30, 2019

(30) Foreign Application Priority Data

Apr. 26, 2019 (UA) .............................. a 2019 04544

(51) Int. Cl.
*H04L 29/06* (2006.01)
*H04L 29/08* (2006.01)

(52) U.S. Cl.
CPC .............. *H04L 67/42* (2013.01); *H04L 67/10* (2013.01); *H04L 67/141* (2013.01); *H04L 67/146* (2013.01); *H04L 67/40* (2013.01)

(58) Field of Classification Search
CPC ....... H04L 67/42; H04L 67/146; H04L 67/40; H04L 67/10; H04L 67/141
USPC ...................................................... 709/203
See application file for complete search history.

(56) References Cited

U.S. PATENT DOCUMENTS

| 5,551,035 A | 8/1996 | Arnold et al. |
| 6,510,451 B2 * | 1/2003 | Wu ........................ G06Q 10/10 209/219 |
| 6,892,236 B1 * | 5/2005 | Conrad ............... G06F 11/3409 709/203 |
| 8,032,900 B2 | 10/2011 | Leonov et al. |
| 2002/0078138 A1 * | 6/2002 | Huang .................... H04L 41/22 709/203 |
| 2002/0116453 A1 * | 8/2002 | Todorov .............. H04L 41/0226 709/203 |
| 2004/0073911 A1 * | 4/2004 | Jenkins ...................... G06F 8/36 719/311 |
| 2009/0164558 A1 * | 6/2009 | Hofmann ............... G06Q 10/06 709/203 |

* cited by examiner

*Primary Examiner* — Michael Won
(74) *Attorney, Agent, or Firm* — Saliwanchik, Lloyd & Eisenschenk

(57) ABSTRACT

A software-controllable computer system and method having architecture for effective interprocess communication of multicomponent software applications are provided. The method includes creating a connection of the Client to the Server that includes forming an intermediator from the side of the Server and forming an intermediator from the side of the Client, when creating the connection of the Client to the Server. The "intermediators" respond to all requests of a certain set of components. If the Client component requests information for operation from the Server, this component will refer to the Client intermediator. The latter refers to the Server intermediator to collect the necessary information. The Server intermediator receives information from the Server component and returns it to the Client intermediator that sends it to the component, which has sent the request.

24 Claims, 4 Drawing Sheets

MULTICOMPONENT SOFTWARE-CONTROLLABLE SYSTEM AND A METHOD FOR INTERACTION OF SERVER-CLIENT PROCESSES AND A MACHINE-READABLE CARRIER FOR PERFORMING THE METHOD

CROSS-REFERENCE TO RELATED APPLICATION

This application claims the benefit of Ukrainian Application No. a 2019 04544, filed Apr. 26, 2019; which is hereby incorporated by reference in its entirety.

FIELD OF THE INVENTION

The invention relates to software-controllable computer systems and, more particularly, it relates to an architecture of effective interprocess communication of multicomponent software applications.

BACKGROUND OF THE INVENTION

A multicomponent software application comprises parts that are functionally divided into at least one Client and at least one Server. The Client is a visual terminal that is seen by a User of the computer system. The Server is a software module that is arranged in the computer system and directly performs all tasks received from the User via the Client. An example of such software application is the MacKeeper© of the Kromtech Alliance company. The MacKeeper© may be installed on a hard drive as on a means for permanent storage of the computer system data. The MacKeeper© has the Client that is a visual terminal for operating with the software application, and the Server is a software module MacKeeper Agent. In one instance, such multicomponent software application comprises ten different system utilities for cleaning unnecessary files from the drive or checking for a number of malicious software and the like. The User performs cleaning of the unnecessary files from the hard drive by means of sending a message to the Server via the Client of the platform of the MacKeeper©. The Server directly performs scanning and cleaning the unnecessary files from the hard drive. In order to send the message, it is necessary to establish a connection between the Client and the Server. In this case, the simplest architectural solution is a single connection between the Client and the Server. However, such solution has following drawbacks.

When the multicomponent software application comprises ten different system utilities, each of them may have ten modules. Each of such ten modules has its own limited functionality. As a result, the multicomponent software application comprises one hundred components on the side of the Server and one hundred components on the side of the Client. If a single connection is established between the Client and the Server, then upon referral by one Client component to the Server with a request for a function of the Server component, none of the other ninety-nine components of either the Client or the Server components can use the communication channel. It clutters the communication channel, creates a queue and slows down the communication between the Client and the Server.

Another solution for increasing the efficiency of the communication between the Client and the Server is a separate communication between each Client component and each Server component. Such approach enlarges software code written for the Server and the Client, increases time for creating the software code, increases loading of each component due to increase of its functionality, as well as complicates the general architecture of the software application. A solution of the problem may lie in architecture of an interprocess interaction between the Server and the Client that provides an effective communication between the Client and the Server, and, simultaneously, saves time for developing the Client and the Server components.

A method and a system for an interprocess communication in a software-controllable system are described in the U.S. Pat. No. 5,551,035 of Aug. 27, 1996. The described solution allows enhancing a structure of a software application that has interconnected components and providing "Server-Client" processes. The enhancement is achieved by a communication mechanism that allows the software application components to create the communication using symbolic names instead of system addresses associated with physical characteristics of the system. An intercomponent communication protocol uses executable expressions having symbolic names only. The symbolic names are stored in a table that is included in a runtime linking module. The table is configured so that it can convert the symbolic names into system addresses. Therefore, such protocol allows for an independent development of interacting software components, thereby simplifying the development. A single component does not know an address of another component, and the Server and the Client are not arranged on a single processor, and the Server and the Client components do not know whether they are arranged on a single processor. Therewith, the communication of the Server and the Client by means of an executable expression provides an asynchronous communication that allows executing functions by the components without need in receiving a response and leads to avoidance of a suspension or termination of the communication between the Server and the Client. However, the described solution does not achieve the required efficiency of the interprocess communication when the system is scaled to have the Server and the Client each comprising a huge number of components. Also, such solution does not allow simplified sharing of the functionality between the Server and the Client due to a presence of the runtime linking module.

Also, a method and a system for a "Server-Client" interprocess communication, are described in the U.S. Pat. No. 8,032,900 B2 of Oct. 4, 2011, disclosing a communication of processes between the Client and the Server. Such communication provides creation of an interprocess interaction thread that is separated from a main thread of the interaction of the Server and the Client. The separated thread establishes connection with a server. An entry point (port) of the Server for establishing a connection with the Client is created upon establishment of the connection with the Server. One or several asynchronous messages are transmitted to the created entry point of the Server. The interprocess interaction allows to avoid a blockage of performing main client processes and, thus, to avoid reduction of the communication speed between the Server and the Client. According to the described solution, a dedicated thread allows to avoid suspension (termination) of client processes when waiting for responses of the server. However, it has a relatively limited field of usage, and it does not allow to simplify the architecture of the software application itself that is important when writing a software code, compiling the software application and introducing modifications thereto. Creation of the dedicated thread for performing the messages leads to losses of memory resources, which are associated with its maintaining of the separate thread.

SUMMARY OF THE INVENTION

The object of the claimed invention is to simplify the interprocess interaction to inhibit encumbering the Client and the Server components due to resource-intensive functionality of the communication in a form of a separate connection for each component.

According to one embodiment of the invention, an intermediator is formed on the side of the Server and another intermediator is formed on the side of the Client, when a connection of the Client to the Server is created. The intermediators can respond to all requests of a certain set of components, e.g., one utility of the software application. If the Client component requests information for operation from the Server, this component will refer to the Client intermediator. The latter refers to the Server intermediator for necessary information. The Server intermediator receives the information from the Server component and returns it to the Client intermediator that sends it to the component, which has sent the request. Therewith, the request of the Client component is created for the Server component in any case (and vice versa) as hardcoded into the software code of these elements of the software application. As a result, the request is not created for the intermediator, however, the created request or information is received, in response, by the intermediator only. The "intermediator" is a primary source of information for the component, but none of the components "knows" the fact that it has a dialog with the "intermediator". The Client components do not have a connection with the Server components. In order to perform functions, the Client components interact with the intermediator only.

Therefore, main advantage of the invention lies in creation of intermediators when connecting the Client to the Server, for maintaining communication and exchange messages with the Client and the Server components respectively. The intermediators comprise a list of functions and requests, which they may be responsible for, in software.

In the architecture of the software application, if the Client has 100 components, then the Server, correspondingly, has 100 components as well. If the 100 components are functionally divided into 10 modules, then such architecture is a mirror-like both for the Server and for the Client. According to an embodiment of the invention, when assigning 10 intermediators for 10 modules of the Client, 10 intermediators will be assigned for 10 modules of the Server as well.

Efficiency of an embodiment of the invention is more noticeable when scaling up the software application. For example, the number of the modules, into which the software application components are combined, can be increased from 10 to 1000. In case of operation without intermediators, it will necessary to write a functionality of the communication and communications for other 990 modules that would increase the development time and requirements for the system operation resources. When using the intermediators, all 1000 modules can perform, as before, their limited functionality, while the intermediator that initially handles 10 modules, and, after the scaling-up, handles 1000 modules, can be responsible for the communication.

If during development of the software it is necessary to transmit the functionality of the Server and the Client, the intermediators can be omitted. The components begin to have a dialog with each other directly without the connection. If communication functionality without intermediators would be written for each Server and Client component, then it would be necessary to remove this functionality from each of the components in case of combining the Client with the Server. The invention also may be used for the case, when a part of the Client functionality is given to the Server. When sharing the functionality between the Client and the Server, the intermediators are added and the Client connection to the Server is carried out according to an embodiment of the invention.

According to one embodiment of the present invention, a method for interaction of "Server-Client" processes of a multicomponent software-controlled system is implemented, the method comprising: creating a server asynchronous connection that has a known connection name used by all server components and client components, creating a provider server module and creating a provider client module, creating at least one server node that comprises an interface of interaction with each server component, and transmitting parameters of interaction with the provider server module to the server node, creating at least one client node that comprises an interface of interaction with each client component and transmitting parameters of interaction with the provider client module to the client node, creating a server connection module configured for transmitting, to the provider server module, a name of the interface of interaction with a specific server component requested by the client component, creating a client connection module configured for receiving requests from the client components, generating an asynchronous connection name for each interface of interaction with the server component and creating a server synchronous connection having the generated name, storing data comprising the name of the interface of interaction with the server component and a name of the created synchronous connection corresponding thereto by the provider server module, coupling the provider client module to the server asynchronous connection using the known connection name, receiving, by the client connection module, the synchronous connection name stored by the provider server module that is requested by the client component according to the name of the interface of interaction with the specific server component, creating a client synchronous connection according to the received synchronous connection name by the client connection module.

In one of embodiments of the method, the creation of the server asynchronous connection is performed by the provider server module.

According to another embodiment of the method, the creation of the server connection module is performed by the server node.

According to another embodiment of the method, the creation of the server connection module includes establishing parameters of interaction of the server connection module with the provider server module for transmitting the name of the interface of interaction with the server component requested by the client component.

According to another embodiment of the method, the creation of the client connection module is performed by the client node.

According to another embodiment of the method, the creation of the client connection module includes establishing parameters of interaction of the client connection module with the provider server module for receiving, from the latter, the synchronous connection name according to the name of the interface of interaction with the specific server component requested by the client component.

According to another embodiment of the method, the generation of the synchronous connection name for each interface of interaction with the server component is performed by the server connection module.

According to another embodiment of the method, receiving, by the client connection module, of the synchronous connection name for the interface of interaction with the specific server component is performed from the provider server module via the provider client module after the corresponding request of the client connection module that comprises the name of the interface of interaction with the specific server component.

According to another embodiment of the invention, a multicomponent software-controllable system that is configured for interaction of "Server-Client" processes is implemented, the system comprising, coupled with each other via a communication interface, a processor device and a means for data operating storage and processing, and a means for data persistence that comprises a set of instructions for client processes and server processes, which are configured to be executed by the processor device by using the means for data operating storage and processing. Therewith, the system comprises: a server asynchronous connection having a known connection name that is used by all server components and client components, a provide server module, a provider client module, at least one server node, at least one client node, a server connection module, a client connection module. Therewith, the provider server module is configured for storing a name of the interface of interaction with the server component and a name of the created synchronous connection corresponding thereto. The provider client module is configured for coupling to the server asynchronous connection using the known connection name and for receiving the synchronous connection name for the interface of interaction with the specific server component requested by the client component. The server node comprises an interface of interaction with each server component and that is configured for receiving parameters of interaction with the provider server module. The client node comprises an interface of interaction with each client component and that is configured for receiving parameters of interaction with the provider client module. The server connection module is configured for transmitting, to the provider server module, the name of the interface of interaction with the specific server component requested by the client component and for generating the synchronous connection name for the interface of interaction with each server component and for creating the server synchronous connection having the generated name. The client connection module is configured for receiving requests from the client components and for receiving, from the provider server module, the synchronous connection name according to the name of the interface of interaction with the specific server component requested by the client component and the client synchronous connection according to the received synchronous connection name.

In one of embodiments of the system, the provider server module is configured for creating the server asynchronous connection.

According to another embodiment of the system, the server node is configured for creating the server connection module.

According to another embodiment of the system, the server node is configured for establishing parameters of interaction of the server connection module with the provider server module for transmitting the name of the interface of interaction with the specific server component requested by the client component.

According to another embodiment of the system, the client node is configured for creating the client connection module.

According to another embodiment of the system, the client node is configured for establishing parameters of interaction of the client connection module with the provider server module for receiving, from the latter, the synchronous connection name according to the name of the interface of interaction with the specific server component requested by the client component.

According to another embodiment of the system, the server connection module is configured for generating the synchronous connection name for each interface of interaction with the server component.

According to another embodiment of the system, the provider server module is configured for transmitting the synchronous connection name for the interface of interaction with the specific server component to the client connection module via the provider client module after the corresponding request of the client connection module that comprises the name of the interface of interaction with the specific server component.

According to another embodiment of the invention, at least one machine-readable carrier is implemented, the carrier comprises a set of machine instructions, which are configured to be executed by a processor device, namely: creating a server asynchronous connection that has a known connection name that is used by all server components and client components, creating a provider server module and creating a provider client module, creating at least one server node that comprises an interface for interaction with each server component, the server node being configured for transmitting parameters of interaction with the provider server module to the server node, creating at least one client node that comprises an interface of interaction with each client component, the client node being configured for transmitting parameters of interaction with the provider client module to the client node, creating a server connection module configured for transmitting, to the provider server module, a name of the interface of interaction with a specific server component requested by the client component, creating a client connection module configured for receiving requests from the client components, generating an asynchronous connection name for the interface of interaction with each server component and creating a server synchronous connection having the generated name, storing data comprising the name of the interface of interaction with the server component and a name of the created synchronous connection corresponding thereto by the provider server module, coupling the provider client module to the server asynchronous connection using the known connection name, receiving, by the client connection module, the synchronous connection name stored by the provider server module that is requested by the client component according to the name of the interface of interaction with a specific server component, creating a client synchronous connection according to the received synchronous connection name by the client connection module.

In one of embodiments of the machine-readable carrier, the latter may comprise a set of machine instructions that is further configured to create the server asynchronous connection by the provider server module.

In one of embodiments of the machine-readable carrier, the latter may comprise a set of machine instructions that is further configured to create the server module by the server node.

In one of embodiments of the machine-readable carrier, the latter may comprise a set of machine instructions that is further configured to establish parameters of interaction of the server connection module with the provider server module for transmitting the name of the interface of interaction with the server component requested by the client component.

In one of embodiments of the machine-readable carrier, the latter may comprise a set of machine instructions that is further configured to create the client connection module by the client node.

In one of embodiments of the machine-readable carrier, the latter may comprise a set of machine instructions that is further configured to establish parameters of interaction of the client connection module with the provider server module for receiving, from the latter, the synchronous connection name according to the name of the interface of interaction with the specific server component requested by the client component.

In one of embodiments of the machine-readable carrier, the latter may comprise a set of machine instructions that is further configured to generate, by the server connection module, the synchronous connection name for each interface of interaction with the server component.

In one of embodiments of the machine-readable carrier, the latter may comprise a set of machine instructions that is further configured to receive, by the client connection module, the synchronous connection name for the interface of interaction with the specific server component from the provider server module via the provider client module after the corresponding request of the client connection module that comprises the name of the interface of interaction with the specific server component.

It should be appreciated that the foregoing general description and further detailed description are solely illustrative and explanatory, and do not limit the claimed invention.

BRIEF DESCRIPTION OF THE DRAWINGS

The provided drawings, which are included into the present description of the invention and constitute its part, illustrate embodiments of the invention and serve to explain the invention principles along with the description.

DETAILED DESCRIPTION

Illustrative embodiments of the invention are described hereinafter in detail, which examples are illustrated by the figures. Implementations of the illustrative embodiments, which are set forth in the further description, do not encompass all implementations, which may exist according to the invention, rather they server solely for an additional explanation of the disclosure of the invention.

Figure 1:
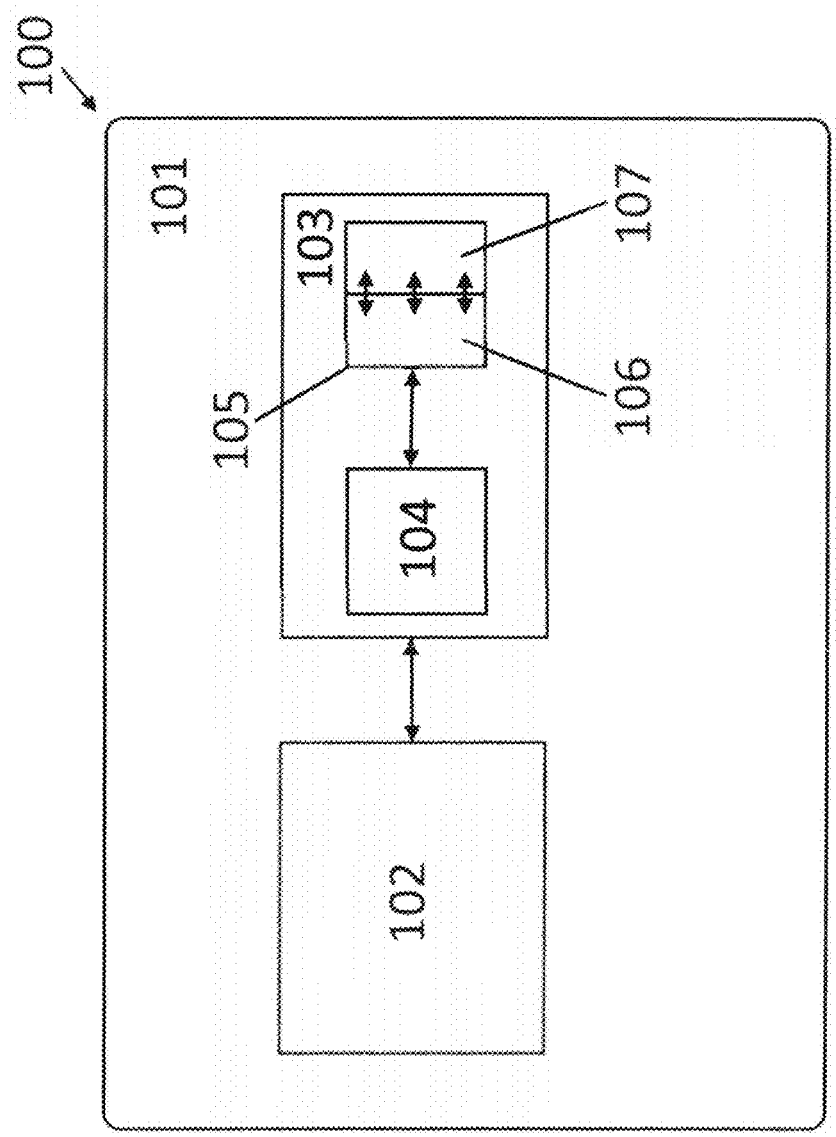
FIG. 1 is a general diagram that shows a multicomponent software-controllable system that is configured for interaction of "Client-Server" processes according to an embodiment of the subject invention.

According to FIG. 1, a multicomponent software-controllable system 100 comprises at least one computing device 101 having one or several processors 102 and a machine-readable carrier 103 coupled thereto. The computing device 101 may be a personal computer, a portable computer (a laptop) and similar devices equipped with a means for inputting information into the computer system 100 (a keyboard, a touch pad, a computer mouse etc.) or configured so that they are able to be coupled with such means, and a means for outputting information (a screen, a printer etc.). The processor 102 may be Ax series processor by the Apple Inc© company or series Ivy Bridge, Haswell, Skylake processor by the Intel Core© company and the like. The machine-readable carrier 103 comprises an external memory, e.g., a solid-state drive (SSD) to store application programs and data, and an internal memory that includes a read-only memory (ROM) and random access memory (RAM), which are configured to store a set of instructions configured to be executed by the processor 102. The carrier 103 is equipped with an operation system 104, e.g., Mac OS by the Apple Inc© company, Windows by the Microsoft© company or another operation system. The set of instructions includes, in particular, an operation sequence for performing an interprocess communication for the operation system 104 and for the software applications 105 installed on the carrier 103. The software application 105 has a multicomponent (multimodule) structure that can be conditionally divided into a set of Server 106 components (modules) and Client 107 components (modules). The Server 106 or Client 107 component can be a module that performs a certain function that is built-in during development thereof.

Figure 2:
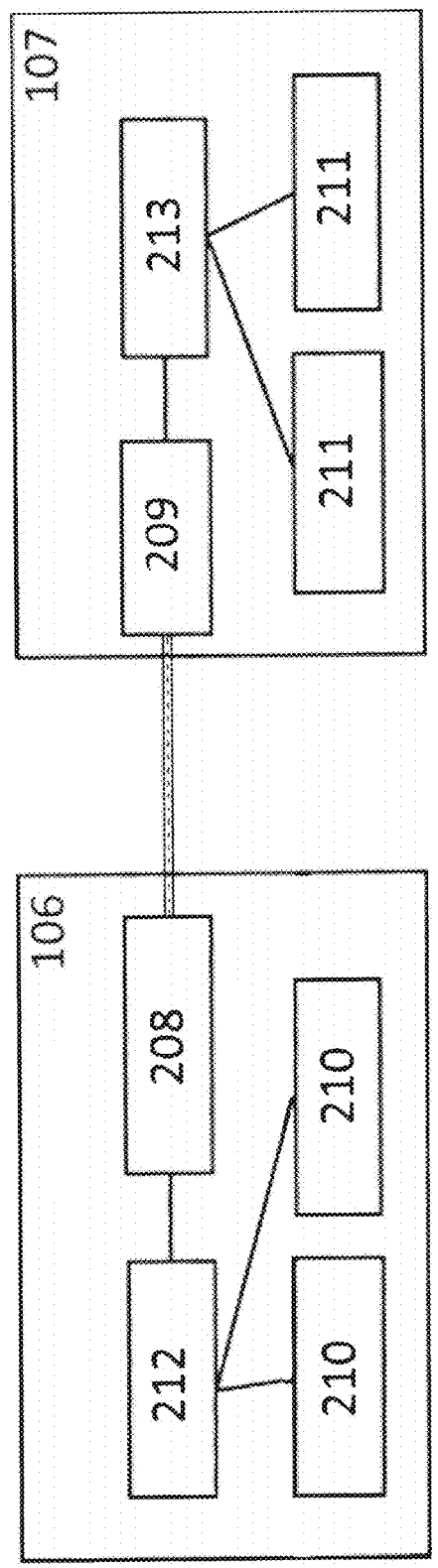
FIG. 2 is a software application diagram that provides interaction of "Client-Server" processes, according to an embodiment of the subject invention.

FIG. 2 shows architecture of the interprocess exchange of data and commands between the Server 106 and the Client 107, according to an embodiment of the invention. According to FIG. 2, the exchange of data and commands between the Server 106 and the Client 107 is performed via the interprocess interaction server component 208 and the interprocess interaction client component 209. The Server 106 further comprises a set of server components 210, and the Client 107 comprises a set of client components 211. Wherein the set of server components 210 and the set of client components 211 are mirror-like For example, for fifteen client components 211, the corresponding fifteen server components 210 are provided. According to an embodiment of the invention, the Server 106 is configured for forming a server node 212, through which the communication of the set of server components 210 is performed when executing commands that are transmitted by the Client 107, while the Client 107 is configured for forming a client node 213, through which the transmission of commands of the set of client components 211 to the Server 106 is performed. For example, both the server node 212 from the side of the Server 106 and the client node 213 from the side of the Client 107 are those intermediators, through which the exchange of data and commands is performed by the set of server components 210 and the set of client components 211.

Figure 3:
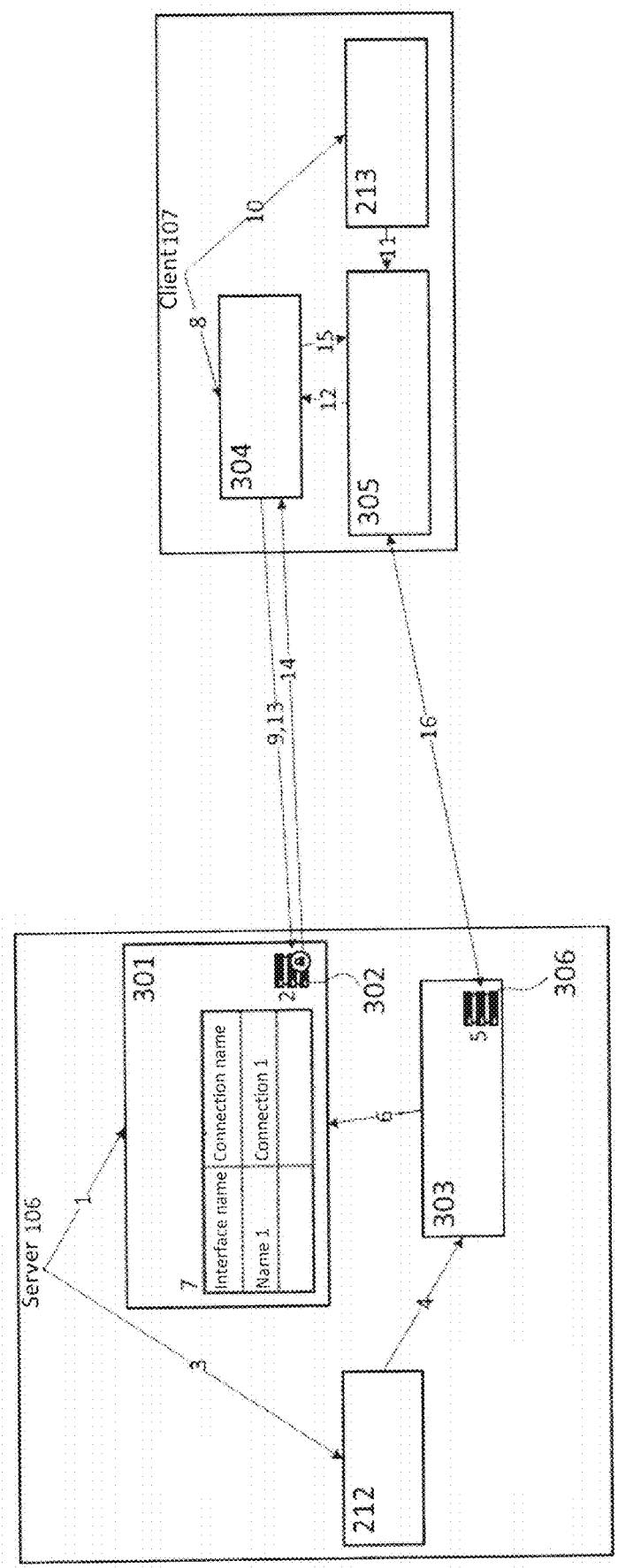
FIG. 3 is a diagram that shows an example of a step-by-step creation of a connection of the Client to the Server, according to an embodiment of the subject invention.

FIG. 3 shows an example of a step-by-step creation of a connection from the Client 107 to the Server 106 for interaction of multicomponent software applications, according to the invention. At the step 1, the Server 106 creates a provider server module 301. At the step 2, the provider server module 301 creates a server asynchronous protected connection 302 having a commonly known name. The commonly known name is the one that is preliminary written in the software application 105 code when writing thereof and, thus, it is known to the set of server components 210 and to the set of client components 211. This server asynchronous protected connection 302 also is a common one for the set of server components 210 and for the set of client components 211, and it is used for initial communication between the Server 106 and the Client 107. At the step 3, the Server 106 creates the server node 212 and reports parameters, which are necessary for the exchange of data and commands with the provider server module 301, thereto. However, the server node 212 does not exchange data and commands with the provider server module 301 directly. At the step 4, the server node 212 creates a server connection module 303 and sets it, namely "introduces" to the provider server module 301 by means of transmission of the following data: an interface of interaction with each server component and its name ("InterfaceName"). Therewith, settings of the server connection module 303 include that the server node 212 responds to all requests of the set of server components 210 received via the interface of interaction with each server component. For example, if the software application 105 comprises fifteen server components 210 and the corresponding client components 211, then a separate interaction interface will be created for each server component 210 and for the corresponding client component 211. A heading ("InterfaceName") is created for each of fifteen interfaces. For example, the interaction interface is a list of questions, which can be responded by a separate component, while the heading "InterfaceName" is a name of the separate component interface. At the step 5, the server connection module 303 generates a random name of the synchronous connection "ConnectionName" and creates a server synchronous connection having the generated name. At the step 6, the server connection module 303 informs the provider server module 301 about creation of the connection having the generated name "ConnectionName" for the interface "InterfaceName". At the step 7, the server connection module 303 stores the received information in a table with a key "InterfaceName" and a value "ConnectionName". Therewith, a separate connection is created for each interface or server component 210 and the corresponding client component 211. At the step 8, the Client 107 creates a provider client module 304. At the step 9, the provider client module 304 is connected to the asynchronous connection according to the commonly known name. At the step 10, the Client 107 creates the client node 213 and "introduces" it to the provider client module 304 by reporting parameters, which are necessary for the exchange of data and commands with the provider client module 304, to the provider client module 304. At the step 11, the client node 213 creates a client connection module 305 and sets it, namely "introduces" to the provider client module 304 by means of transmission of the following data: an interface of interaction with each client component and its name ("InterfaceName"). According to the example, for fifteen server components 210 and for client components 211 corresponding thereto, when creating the software application 105 code for a part of the Client 107, the client node 213 ("intermediator") having a separate interface and a name "Interface Name" for each component is created for each of the components. At the step 12, the client connection module 305 requests a connection name for the interface having the name "InterfaceName" from the provider client module 304. At the step 13, the provider client module 304 requests a connection name for the interface having the name "InterfaceName" from the provider server module 301. At the step 14, the provider server module 301 receives the connection name "ConnectionName" from the table according to the key "InterfaceName" and transmits it to the provider client module 304. At the step 15, the provider client module 304 transmits the connection name "ConnectionName" to the client connection module 305. At the step 16, the client connection module 305 creates the client synchronous connection 306 according to the received connection name "ConnectionName".

As a result, at the side of the Client 107, the intermediator in the form of the client node 213 is created that is ready to respond to requests described in the interaction interface. Therewith, the client node 213 simply forwards the received requests to the created intermediator at the side of the Server 106 via the client synchronous connection. Therewith, all set of the client components 211 may refer to the client node 213 only (FIG. 2) that receives requests for interaction with the specific server components 210 therefrom and, thus, it is a primary source of information for interaction.

An embodiment of the invention may include two alternative sequences for creating the connection of the Client 107 to the Server 106. According to the first alternative, the server connection process turns on earlier than any of the client processes. Therein, the creation of the connection is performed in the way as described above. According to the second alternative, the client process turns on earlier than the server process. In such situation, notifying the Client 107 about creation of the Server 106 and continuing the connection attempt is a problem. The invention has embodiments for solving such problems by sending messages, according to the alternative connection diagram (FIG. 4) that corresponds to an embodiment of the invention.

Figure 4:
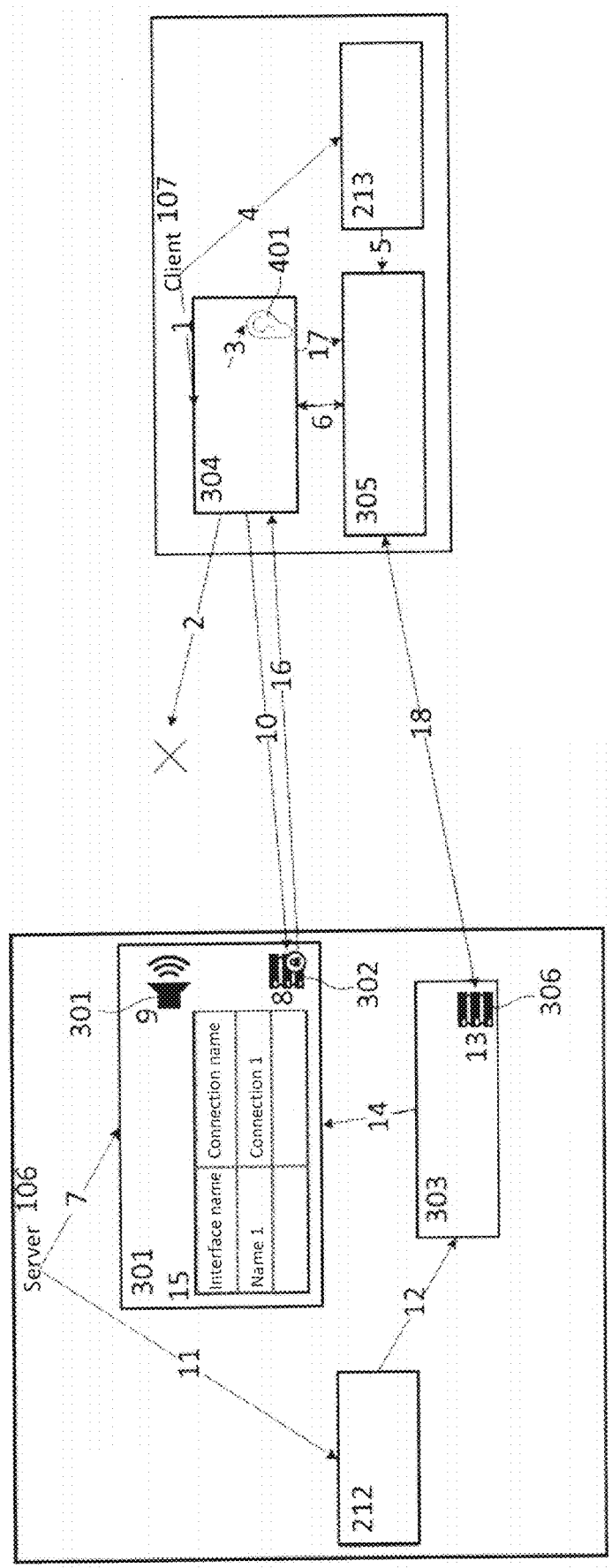
FIG. 4 is a diagram that shows an example of a step-by-step creation of a connection of the Client to the Server, according to an embodiment of the subject invention.

According to FIG. 4, at the step 1 the Client 107 creates the provider client module 304. At the step 2, the provider client module 304 is scheduled to connect via the server asynchronous protected connection 302 to the provider server module 301 using the commonly known name. The provider client module 304 receives information about absence of the Server 106. At the step 3, the provider server module 301 is in a pending state 401 waiting for a message about opening of the server connection. At the step 4, the Client 107 creates the client node 213 and "introduces" it to the provider client module 304 by reporting parameters, which are necessary for the exchange of data and commands with the provider client module 304, to the provider client module 304. At the step 5, the client node 213 creates a client connection module 305 and sets it, namely "introduces" to the provider client module 304 by means of transmission of the following data: an interface of interaction with each client component and its name ("InterfaceName"). At the step 6, the client connection module 305 transmits a request to the provider client module 304 for receiving the connection name for the interface having a name "InterfaceName". The provider client module 304 transmits a response about absence of the opened connection for the "InterfaceName" to the client connection module 305. At the step 7, the Server 106 creates the provider server module 301. At the step 8, the provider server module 301 creates the server asynchronous protected connection 302 having a commonly known name. At the step 9, the provider server module 301 transmits a message 402 about creation of the server connection. At the step 10, the provider client module 304 receives the message and connects via the server asynchronous protected connection 302 to the provider server module 301 using the commonly known name. At the step 11, the Server 106 creates the server node 212 and reports parameters, which are necessary for the exchange of data and commands with the provider server module 301, thereto. At the step 12, the server node 212 creates a server connection module 303 and sets it, namely "introduces" to the provider server module 301 by means of transmission of the following data: an interface of interaction with each server component and its name ("InterfaceName"). Therewith, settings of the server connection module 303 include that the server node 212 responds to all requests of the set of server components 210 received via the interface of interaction with each server component. At the step 13, the server connection module 303 generates a random name of the synchronous connection "ConnectionName" and creates a server synchronous connection having the generated name. At the step 14, the server connection module 303 informs the provider server module 301 about creation of the connection having the generated name "ConnectionName" for the interface "InterfaceName". At the step 15, the server connection module 303 stores the received information in a table with a key "InterfaceName" and a value "ConnectionName". At the step 16, the provider server module 301 informs the provider client module 304 about registration of the connection for the interface of interaction with "InterfaceName". At the step 17, the provider client module 304 informs the client connection module 305 about opening of the connection having a name "ConnectionName". At the step 18, the client connection module 305 creates the client synchronous connection 306 according to the received connection name "ConnectionName".

What is claimed is:

1. A method for interaction of "server-client" processes of a multicomponent software-controllable system, the method comprising:

creating, by a server, a provider server module;

creating, by a client, a provider client module;

creating, by the provider server module, a server asynchronous connection having a known connection name that is used by all server components and client components;

creating, by the server, at least one server node comprising an interface of interaction with each server component, and transmitting parameters of interaction with the provider server module to the server node;

creating, by the client, at least one client node comprising an interface of interaction with each client component, and transmitting parameters of interaction with the provider client module to the client node;

creating, by the server node, a server connection module that is configured for transmitting, to the provider server module, a name of the interface of interaction with a specific server component requested by the client component;

creating, by the client node, a client connection module configured for receiving requests from the server components;

generating, by the server connection module, a synchronous connection name for each interface of interaction with the server component and creating a server synchronous connection having the generated name;

storing, by the server connection module, data comprising the name of the interface of interaction with the server component and the synchronous connection name corresponding thereto by the provider server module;

coupling the provider client module to the server asynchronous connection with the known connection name;

receiving, by the client connection module, the synchronous connection name stored by the provider server module, the name being requested by the client component according to the name of the interface of interaction with the specific server component; and creating, by the client connection module, a client synchronous connection according to the received synchronous connection name by the client connection module.

2. The method according to claim 1, wherein the creating of the server asynchronous connection is performed by the provider server module.

3. The method according to claim 1, wherein the creating of the server connection module is performed by the server node.

4. The method according to claim 3, wherein the creating of the server connection module includes establishing parameters of interaction of the server connection module with the provider server module for transmitting the name of the interface of interaction with the server component requested by the client component.

5. The method according to claim 1, wherein the creating of the client connection module is performed by the client node.

6. The method according to claim 5, wherein the creating of the client connection module includes establishing parameters of interaction of the client connection module with the provider server module for receiving, from the latter, the synchronous connection name according to the name of the interface of interaction with the specific server component requested by the client component.

7. The method according to claim 1, wherein the generating of the synchronous connection name for each interface of interaction with the server component is performed by the server connection module.

8. The method according to claim 1, wherein the receiving, by the client connection module, of the synchronous connection name for the interface of interaction with the specific server component is performed from the provider server module via the provider client module after the corresponding request of the client connection module that comprises the name of the interface of interaction with the specific server component.

9. A multicomponent software-controllable system that is configured for interaction of "Server-Client" processes, the system comprising, coupled with each other via a communication interface, a processor device and a means for data operating storage and processing, and a means for data persistence that comprises a set of instructions for client processes and server processes, which are configured to be executed by the processor device by using the means for data operating storage and processing, the system comprising:

a server asynchronous connection having a known connection name that is used by all server components and client components, a provider server module that is configured for storing a name of the interface of interaction with the server component and a name of a created synchronous connection corresponding thereto, a provider client module that is configured for:
coupling to the server asynchronous connection using the known connection name,
receiving the synchronous connection name for the interface of interaction with a specific server component requested by the client component, at least one server node that comprises an interface of interaction with each server component and that is configured for receiving parameters of interaction with the provider server module, at least one client node that comprises an interface of interaction with each client component and that is configured for receiving parameters of interaction with the provider client module, a server connection module that is configured for:

transmitting, to the provider server module, the name of the interface of interaction with a specific server component requested by the client component,
generating a synchronous connection name for the interface of interaction with each server component and creating a server synchronous connection having the generated name, and
a client connection module that is configured for:
receiving requests from the client components and receiving, from the provider server module, the synchronous connection name according to the name of the interface of interaction with the specific server component requested by the client component,
a client synchronous connection according to the received synchronous connection name.

10. The system according to claim 9, wherein the provider server module is configured for creating the server asynchronous connection.

11. The system according to claim 9, wherein the server node is configured for creating the server connection module.

12. The system according to claim 11, wherein the server node is configured for establishing parameters of interaction of the server connection module with the provider server module for transmitting the name of the interface of interaction with the specific server component requested by the client component.

13. The system according to claim 9, wherein the client node is configured for creating the client connection module.

14. The system according to claim 13, wherein the client node is configured for establishing parameters of interaction of the client connection module with the provider server module for receiving, from the latter, the synchronous connection name according to the name of the interface of interaction with the specific server component requested by the client component.

15. The system according to claim 9, wherein the server connection module is configured for generating the synchronous connection name for each interface of interaction with the server component.

16. The system according to claim 9, wherein the provider server module is configured for transmitting the synchronous connection name for the interface of interaction with the specific server component to the client connection module via the provider client module after the corresponding request of the client connection module that comprises the name of the interface of interaction with the specific server component.

17. A non-transitory computer readable medium comprising machine readable instructions executable by computing hardware, the non-transitory computer readable medium comprising instructions for:
creating, by a server, a provider server module;
creating, by a client, a provider client module;
creating, by the provider server module, a server asynchronous connection having a known connection name that is used by all server components and client components;
creating, by the server, at least one server node comprising an interface of interaction with each server component, and transmitting parameters of interaction with the provider server module to the server node;
creating, by the client, at least one client node comprising an interface of interaction with each client component, and transmitting parameters of interaction with the provider client module to the client node;
creating, by the server node, a server connection module that is configured for transmitting, to the provider server module, a name of the interface of interaction with a specific server component requested by the client component;
creating, by the client node, a client connection module configured for receiving requests from the server components;
generating, by the server connection module, a synchronous connection name for each interface of interaction with the server component and creating a server synchronous connection having the generated name;
storing, by the server connection module, data comprising the name of the interface of interaction with the server component and the synchronous connection name corresponding thereto by the provider server module;
coupling the provider client module to the server asynchronous connection with the known connection name;
receiving, by the client connection module, the synchronous connection name stored by the provider server module, the name being requested by the client component according to the name of the interface of interaction with the specific server component; and
creating, by the client connection module, a client synchronous connection according to the received synchronous connection name by the client connection module.

18. The non-transitory computer readable medium according to claim 17, comprising a set of machine instructions that is further configured to create the server asynchronous connection by the provider server module.

19. The non-transitory computer readable medium according to claim 17, comprising a set of machine instructions that is further configured to create the server module by the server node.

20. The non-transitory computer readable medium according to claim 17, comprising a set of machine instructions that is further configured to establish parameters of interaction of the server connection module with the provider server module for transmitting the name of the interface of interaction with the server component requested by the client component.

21. The non-transitory computer readable medium according to claim 17, comprising a set of machine instructions that is further configured to create the client connection module by the client node.

22. The non-transitory computer readable medium according to claim 17, comprising a set of machine instructions that is further configured to establish parameters of interaction of the client connection module with the provider server module for receiving, from the latter, the synchronous connection name according to the name of the interface of interaction with the specific server component requested by the client component.

23. The non-transitory computer readable medium according to claim 17, comprising a set of machine instructions that is further configured to generate, by the server connection module, the synchronous connection name for each interface of interaction with the server component.

24. The non-transitory computer readable medium r according to claim 17, comprising a set of machine instructions that is further configured to receive, by the client connection module, the synchronous connection name for the interface of interaction with the specific server component from the provider server module via the provider client module after the corresponding request of the client connection module that comprises the name of the interface of interaction with the specific server component.

\* \* \* \* \*